US005836722A

United States Patent [19]

Lacchia

[11] Patent Number: 5,836,722

[45] Date of Patent: Nov. 17, 1998

[54] SPRAYING METHOD AND DEVICE FOR COOLING A POWDERED COATING PRODUCT

[75] Inventor: Adrien Lacchia, Saint Martin le Vinoux, France

[73] Assignee: Sames S.A., Meylan, France

[21] Appl. No.: 553,440

[22] PCT Filed: May 19, 1994

[86] PCT No.: PCT/FR94/00592

§ 371 Date: Nov. 21, 1995

§ 102(e) Date: Nov. 21, 1995

[87] PCT Pub. No.: WO94/27731

PCT Pub. Date: Dec. 8, 1994

[30] Foreign Application Priority Data

May 24, 1993 [FR] France .................................. 93 06137

[51] Int. Cl.[6] ..................................................... B65G 53/48

[52] U.S. Cl. ............................ 406/122; 406/61; 406/138; 198/657; 198/952; 222/146.6

[58] Field of Search ................................. 406/53, 55, 56, 406/60, 61, 108, 122, 134, 136, 138, 144; 198/657, 952; 222/146.1, 146.6

[56] References Cited

U.S. PATENT DOCUMENTS

| | | | |
|---|---|---|---|
| 1,450,903 | 4/1923 | Newhouse | 406/61 X |
| 4,183,702 | 1/1980 | Bonnel | 406/56 |
| 4,488,838 | 12/1984 | Herud | 406/56 |
| 4,691,865 | 9/1987 | Hoffman et al. | 239/690 |
| 4,759,500 | 7/1988 | Hoffman et al. | 239/3 |
| 4,826,361 | 5/1989 | Merz | 406/60 |
| 5,061,510 | 10/1991 | Nussbaumer et al. | 427/478 |
| 5,209,608 | 5/1993 | Edwards | 406/131 X |

FOREIGN PATENT DOCUMENTS 235426 9/1982 European Pat. Off. .

OTHER PUBLICATIONS

Patent Abstracts of Japan, vol. 9, No. 287 (C–314) 14 Nov. 1985 of JP,A,60 132 632 (Matsushitas Denki Sangyo KK).

Patent Abstracts of Japan, vol. 14, No. 439 (C–761) 19 Sep. 1990 of JP,A,02 172 551 (Babcock Hitachi).

*Primary Examiner*—Andrew C. Pike
*Attorney, Agent, or Firm*—Loeb & Loeb LLP

[57] ABSTRACT

In a coating plant, the powder feed device is cooled permanently in order to avoid the deterioration of the powder which could be caused by an excessively high temperature. The air for the fluidization of the powder contained in the reservoir (1) is cool, dry air. A heat exchanger (30) supplies a closed loop circuit which includes an annular cooling chamber (32) and a coil (33) arranged in the path of the powder. The shaft of the worm screw may also be cooled.

14 Claims, 1 Drawing Sheet

SPRAYING METHOD AND DEVICE FOR COOLING A POWDERED COATING PRODUCT

Figure 1:
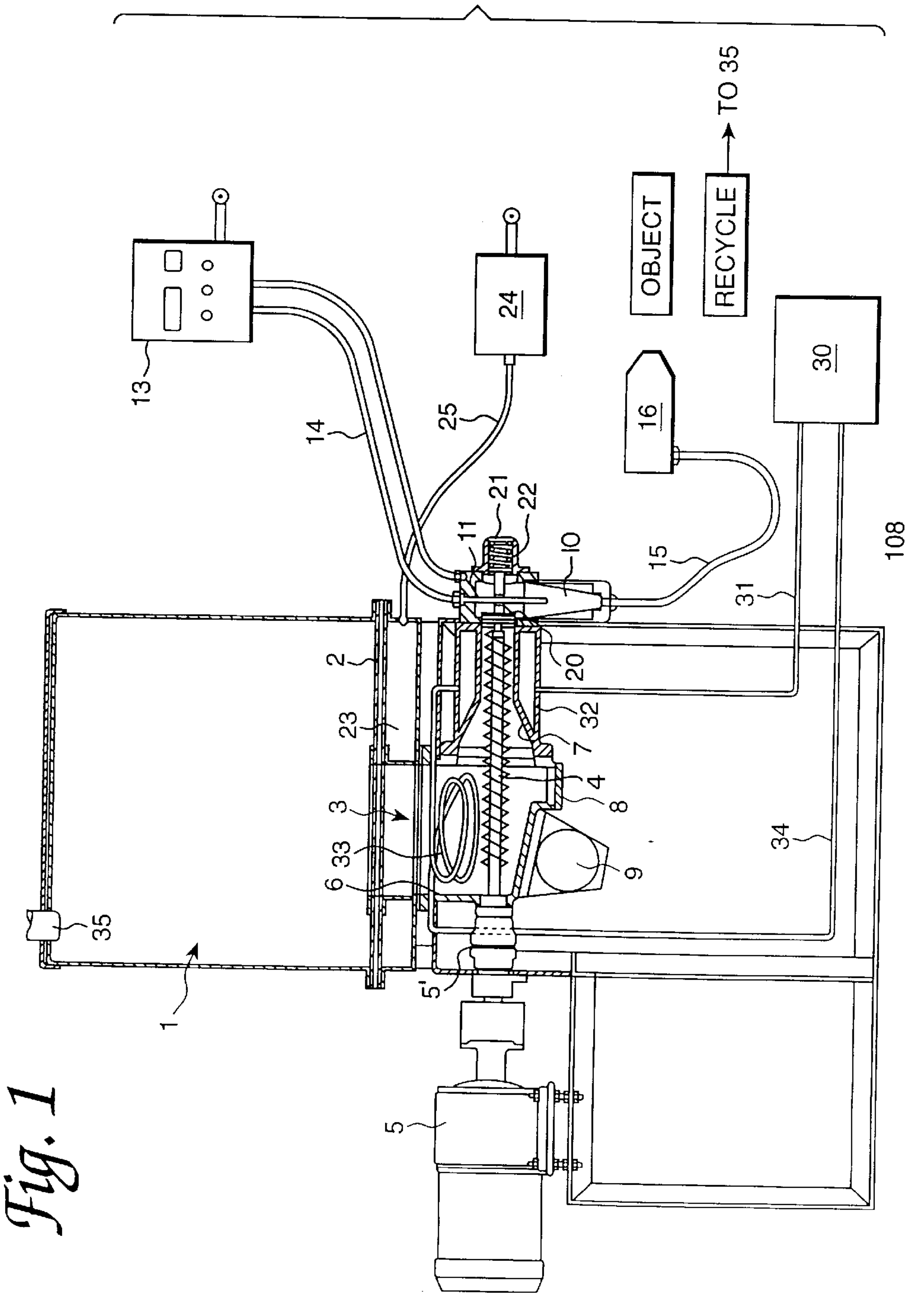

The invention concerns a feed method and device for a powdered product projection plant, notably a coating product in powder form. It concerns also a projection plant for such a powdered product.

In numerous industrial applications, the powdered product, normally termed "powder", is led from a product reservoir to its point of use, for example a sprayer of the pneumatic or centrifugal type. The powder is entrained by an air jet in a conduit having a substantial length, often convoluted and of relatively small diameter.

It is essential that the feeding of powder be continuous, homogenous, and stable during an extended period and regulatable with precision and rapidity. For this purpose, one can use an aspiration device of the Venturi type. One can also use a worm screw or an Archimedes screw mounted at the bottom of a hopper, ending at a nozzle supplied with entrainment air by an injector. Such a system presents advantages with respect to a powder aspiration device, notably because of the regularity of the mass flow of powder despite variable pressure losses.

The powders utilized are generally intended to be baked at around 180° C. after having been applied. Now, it has been noted that this baking phase causes yellowing of certain powders. New powders which have recently been developed which require a baking at no more than 140° C. This permits resolution of the problem of yellowing but introduces a supplemental limitation because these powders experience rapid alteration at ambient temperature. They must be stored at low temperatures, preferably between 5° C. and 10° C. In addition, the polymerization point of these powders is low and they are liable to polymerize at points where the temperature has a tendency to be elevated, such as, for example, around the worm screw of a mechanical entrainment system. It is necessary to retain in the reservoir only the powder consumed during a period less than that beyond which the powder deteriorates. This requires frequent fillings of the reservoir.

The powder must traverse a relatively long trajectory, of the order of 10 meters for example, in the conduit situated between the feeding device and the sprayer with which it is associated. Friction in this conduit can raise the temperature of the powder and deteriorate it or cause it to polymerize.

In addition, if the device is halted at the end of a work day or at the end of a week, the reservoir and the associated drive system of necessity contain remains of powder. They must be completely emptied of powder and this latter must be stored in a cool and dry place such as a refrigerator during the period of stoppage of the installation. It is imperative to clean the reservoir and the worm screw very carefully because, if powder remains therein during a prolonged period, there is a risk that it will be degraded or agglutinated, for example along the worm screw, which would be troublesome during restarting of the device. This require operations which are long, difficult, and frequent.

One of the essential advantages of coating with a powdered product is that the product which has not reached the target, i.e. the object to be painted, can be recycled by an appropriate device for recovering the powder in the booth and a device for transporting this recovered powder toward the powder feed device of the installation where it is mixed with new powder. Now, the powder undergoes heating during spraying; if its temperature at the outlet of the feed device is too high, there is thus a risk that it will not be recoverable. In addition, there is a risk that the recovered powder will raise the temperature of the new powder during mixing, even if this latter has been stored in a refrigerator until the moment when it is poured into the reservoir of the feed system.

The invention resolves the totality of these problems.

It concerns a feed method for a powdered product projection plant such as particularly a powdered coating product characterized in that the product is cooled at the interior of the product feed device of said installation.

Due to this method the temperature of the powder is maintained below 15° C., preferably between 5° C. and 10° C. Relatively large reservoirs can be provided to contain the powder required during a work day, or even more. It is no longer necessary to empty the powder reservoir and the body surrounding the worm screw, at the end of a work period. Deterioration of the powder, and particularly its polymerization, is avoided in the locations of the feed device where a heating is produced, for example by friction, such as the sheath surrounding the worm screw. In addition, if the powder is recovered in the booth, it is rapidly returned to a good temperature upon its return into the reservoir.

The temperature in a coating workshop can vary substantially, for example on a seasonal basis. Now, the mechanical and chemical properties of the powder vary with this temperature: it will be more or less "sticky", and will agglomerate more or less depending on the temperature. As a result of the process according to the invention, the powder is utilized under optimal conditions throughout the year.

The invention also concerns a feed device for a powdered product projection plant, such as for example a powdered coating product, comprising a reservoir and a mechanical transport unit, characterized in that it comprises means for cooling the powdered product.

These cooling means can consist of only one or a combination of several of the following systems:

- a system for fluidizing the powder in the reservoir of the installation with the use of cold air,
- a system for cooling the sheath of the worm screw of the installation,
- a system for entraining the powder in the nozzle with cold air,
- a system for cooling the powder with the aid of a coil placed on the path of the powder between the reservoir and the worm screw, and
- a system for cooling the worm screw.

Figure 2:
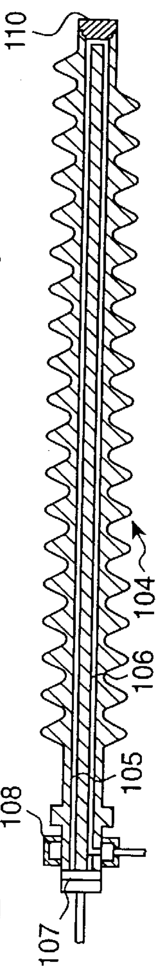

The invention will be better understood and other advantages thereof will come more clearly to light from the description which follows of an embodiment of a transport device for a powdered product according to its principle, given uniquely by way of example and made with reference to the attached drawings in which:

FIG. 1 is a schematic view of a powdered product transport device according to the invention; and FIG. 2 is a view of a worm screw according to a variant of the invention.

The device of FIG. 1 includes a fluidized powder storage reservoir 1 the bottom of which is constituted by a porous plate 2 through which a gas such as air is injected in order to fluidize the powder and entrain it toward an opening 3. This latter is provided in the bottom of reservoir 1 and is extended by a body 6 forming a hopper in which is installed a worm screw 4 driven by a motor 5, for example an electric motor. One end of body 6, at the downstream side of worm screw 4, forms a sheath 7. Body 6 includes, in its lower part, a drainage opening blocked by a removable plug 8. A vibrator 9 is mounted on body 6, at the exterior thereof. During periods of use of the device, the assembly constituted by reservoir 1 and body 6 is thus caused to vibrate. In order to prevent the heat generated by the operation of the motor from being transmitted to worm screw 4, a thermal seal 5' is placed between motor 5 and worm screw 4.

The device also comprises an entrainment nozzle 10 connected to the outlet of sheath 7 and comprising an injector 11 supplied with air by a compressed air supply conduit 14 connected to a control board 13. The compressed air source and possibly the required regulator are not shown. The outlet of the nozzle 10 is connected to a flexible conduit 15 feeding powder to an electrostatic, for example, an automatic type. Along the path of the powder, between the worm screw 4 and the nozzle 10, is disposed a one-way valve 20, pneumatically controlled to be opened by a piston 22 and controlled to be closed by a spring 21 bearing against said piston.

The powder recovered in the booth (not shown) of the plant is intended to be recycled and returned to the feed device by a conduit whose inlet 35 opens into the upper part of the reservoir 1.

Air for fluidizing the reservoir 1 is furnished to a distribution chamber 23, situated under the porous plate 2, by a supply 24 of dry air, through a conduit 25. The dew point of the air furnished for fluidization is 2° C. and this air is cold, i.e. at a temperature below 15° C., preferably between 5° C. and 10° C. The temperature of the powder in the reservoir 1 is thus maintained at a low value independent of the exterior temperature conditions which can vary considerably from one season to another.

A heat exchanger 30 feeds, through a conduit 31, an annular chamber 32 defined around sheath 7 with cold water or a fluorinated hydrocarbon such as one sold under the trademark FREON. This device permits cooling of the sheath 7 and the powder which is located at the interior.

According to an advantageous modification of the invention, the circuit constituted by the conduit 31 and the chamber 32 is not closed directly on the heat exchanger 30 but also includes a coil 33 housed in the hopper, below the opening 3, i.e., in the path of the powder falling from the reservoir 1 onto the worm screw 4. A return conduit 34 closes the cooling circuit of the exchanger 30.

As a result of this device, the powder located in the body 6 is permanently maintained at a rather low temperature so that its conservation will not be limited too substantially over time.

According to another possibility according to the invention, the air injected into the conduit 14 is at a low temperature, for example in the neighborhood of that of the air utilized to fluidize the powder in the reservoir 1. This air can be furnished by the supply 24. Thus, the powder which has been cooled in the feed device is maintained at an adequate temperature until its arrival into the sprayer 16.

The worm screw 104 shown in FIG. 2 comprises, in its axial part, two channels 105 and 106 for circulation of a cooling fluid furnished by a unit similar to the heat exchanger 30 of FIG. 1. The channel 105 communicates with an axial rotating seal 107 mounted at one end of the screw, while the channel 106 opens at a radial opening into an annular chamber 108 defined in the neighborhood of this same end of the screw around a cylindrical portion thereof. Seals are provided at the interfaces of the movable parts in contact in order to assure the necessary sealing of the cooling fluid circulation circuit. The two channels 105 and 106 are connected together at the other end of the worm screw 104 in an opening blocked by a plug 110. This device permits maintaining the worm screw 104 and in particular its blades at a relatively low temperature to prevent polymerization of the powder on the blades.

I claim:

1. A method for coating an object with a powdered coating product comprising: providing a mass of the powdered coating product in a product feeding device; cooling the powdered coating product within the product feeding device to a temperature which prevents deterioration of the powdered coating product; delivering the cooled powdered coating product to a sprayer; and spraying the powdered coating product onto the object by the sprayer.

2. Method according to claim 1, wherein said cooling comprises maintaining the product at a temperature lower than 15° C.

3. A method as defined in claim 2 wherein the product is maintained at a temperature between 5° C. and 10° C.

4. Method according to claim 1, wherein said providing step comprises using a mixture of new product and recycled product.

5. A device for coating an object with a powdered coating product comprising: a product feeding device containing the powdered coating product; means for cooling the powdered coating product within the product feeding device to a temperature which prevents deterioration of the powdered coating product; a sprayer for spraying the powdered coating product onto the object; and means connected between said product feeding device and said sprayer for delivering the cooled powdered coating product to said sprayer.

6. Coating device according to claim 5 wherein said cooling means comprise a closed loop circulation circuit of cold fluid.

7. Coating device according to claim 6 wherein said closed loop circulation circuit comprises an annular chamber around said product feeding device.

8. Coating device according to claim 6 wherein the closed loop circulation circuit comprises a coil placed on a path of the powdered product within said product feeding device.

9. Coating device according to claim 5 wherein said product feeding device comprises a worm screw having two interior channels for circulation of a cooling fluid.

10. Coating device according to claim 9 wherein the fluid is water or a fluorinated hydrocarbon.

11. Coating device according to claim 5 wherein said cooling means comprises a fluidization circuit for conveying the powdered coating product, said fluidization circuit being fed by a gas at a temperature.

12. Coating device according to claim 5 wherein said cooling means comprises a nozzle conducting an entrainment gas at a temperature.

13. Coating device according to claim 5 wherein said product feeding device comprises: a mechanical transport unit; drive means for driving said mechanical transport unit; and a thermal seal between said mechanical transport unit and said drive means.

14. Coating device according to claim 5 further comprising an inlet for delivering the product which has been sprayed to said product feeding device.

* * * * *